3,527,765
PRODUCTION OF EPITHIOALKANES
Jack E. Reece and James T. Edmonds, Jr., Bartlesville,
Okla., assignors to Phillips Petroleum Company, a corporation of Delaware
No Drawing. Filed June 12, 1967, Ser. No. 645,485
Int. Cl. C07d 89/02
U.S. Cl. 260—327      6 Claims

ABSTRACT OF THE DISCLOSURE

Epithioalkanes are formed by the pyrolysis of tris(2-mercaptoalkyl)borates. In one embodiment, a tris(2-mercaptoalkyl)borate is formed by esterification of a 2-mercaptoalkanol with an acidic boron compound.

BACKGROUND OF THE INVENTION

This invention relates to the production of epithioalkanes. In one aspect, it relates to the production of epithioalkanes by the pyrolysis of the corresponding tris(2-mercaptoalkyl)borates. In a more specific aspect, it relates to the pyrolysis of tris(2-mercaptoethyl)borate to produce 1,2-epithioethane. In another aspect, it relates to the preparation of a tris(2-mercaptoalkyl)borate by the esterification of a 2-mercaptoalkanol with an acidic boron compound. In yet another aspect, it relates to the novel borates formed by the esterification of 2-mercaptoalkanol with an acidic boron compound.

The utility of epithioalkanes is well known. For example, a number of these compounds have been disclosed as being useful in insecticidal and fungicidal compositions in U.S. Pat. 2,225,573. In addition, the compounds, and particularly 1,2-epithioethane, are highly reactive chemical materials, and have been used in numerous syntheses to form other compounds of known utility. A number of these syntheses have been described in the "Journal of the American Chemical Society," Vol. 70, page 217 (1948). A number of methods for forming the epithioalkanes have been suggested in the prior art. These prior art methods of synthesis, however, are not entirely satisfactory for a variety of reasons.

SUMMARY OF THE INVENTION

According to our invention, epithioalkanes are formed by pyrolyzing the corresponding tris(2-mercaptoalkyl)borates. These borates appear to be novel and, according to our invention, are formed by the esterification of a 2-mercaptoalkanol with an acidic boron compound.

DESCRIPTION OF THE PREFERRED EMBODIMENTS

The epithioalkanes produced by the process of our invention have the general formula

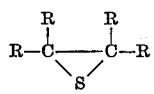

wherein each R is hydrogen, alkyl, cycloalkyl, aryl, or combinations of these such as aralkyl, alkaryl, and the like. When the R's are hydrocarbyl radicals, they can contain from 1 to about 10 carbon atoms per radical, and preferably contain 5 or fewer carbon atoms. Each molecule of such epithioalkanes normally will not contain more than about 20 carbon atoms.

Epithioalkanes which can be produced by the process of our invention include such compounds as 1,2-epithioethane
1,2-epithipropane
2,3-epithiobutane
1,2-epithio-2-methylpropane
1,2-epithio-2-methylbutane
1,2-epithiododecane
10,11-epithioeicosane
2,3-epithio-2,3-dimethyloctane
2,3-dibenzyl-2,3-epithiohexane
1,2-epithio-1,1-diphenylpentane
1,2-dicyclohexyl-1,2-epithioethane
2,3-epithio-2,3-dimethylbutane
3-benzyl-2,3-epithio-2-methylpentane
1,2-epithiopentane
2,3-epithiopentane
1,2-epithio-3-methylbutane
2,3-epithio-2-methylbutane and the like.

The epithioalkanes are produced according to the process of our invention by the pyrolysis of the corresponding tris(2-mercaptoalkyl)borates. These compounds have, in the preferred embodiment, the general formula

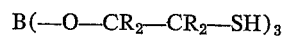

wherein R is as defined above. Preferably, at least one R on the carbon bonded to the oxygen is hydrogen. More preferably, at least one R on the carbon bonded to the oxygen atom and both R's on the carbon bonded to the sulfur atom are hydrogen.

Examples of such tris(2-mercaptoalkyl)borates include tris(2-mercaptoethyl)borate
tris(2-mercaptopropyl)borate
tris(2-mercapto-2-methylpropyl)borate
tris(2-mercapto-2-methylbutyl)borate
tris(2-mercaptododecyl)borate
tris(2-mercapto-1-nonylundecyl)borate
tris(2-mercapto-1-methylethyl)borate
tris(1-ethyl-2-mercapto-1-methylethyl)borate
tris(1,2-dibenzyl-2-mercapto-1-methylpentyl)borate
tris(1,1-diphenyl-2-mercaptopentyl)borate
tris(1,2-dicyclohexyl-2-mercaptoethyl)borate
tris(2-mercapto-1,1,2-trimethylpropyl)borate
tris(2-benzyl-1,1-dimethyl-2-mercaptobutyl)borate
tris(2-mercapto-2-methylpropyl)borate
tris(2-mercapto-1-propylethyl)borate
tris(1-ethyl-2-mercaptopropyl)borate
tris(1,1-dimethyl-2-mercaptopropyl)borate
tris(1-ethyl-2-mercapto-1-methylethyl)borate and the like.

Temperatures for the above pyrolysis reaction can range from the lowest temperature at which pyrolysis is effected, or about 150° C., to about 500° C. Preferably, such temperatures are in the range of about 200° C. to 250° C. Pressures of one atmosphere or less can be employed, preferably, the said pyrolysis is effected under vacuum.

Basic materials are preferably employed to catalyze the pyrolysis reaction. For example, bases such as sodium carbonate, sodium hydroxide, potassium hydroxide, tertiary amines, alkali metal alkoxides such as sodium methoxide, and the like can be employed in catalytic amounts.

The optimum level of basic material used to catalyze the pyrolysis reaction can readily be determined by one skilled in the art for the particular compound being pyrolyzed, and the temperature conditions being used. In general, an amount of basic material in the range of about 0.001 to about 30 weight percent of the borate compound will be suitable. When using basic materials in the upper part of this concentration range, the epithioalkane products that are formed should be removed promptly to prevent their polymerization in the basic medium. Such removal is conveniently accomplished by continuous distillation of the product as it is formed.

Further in accordance with this invention, the tris(2-mercaptoalkyl)borate compounds are synthesized by esterifying a corresponding 2-mercaptoalkanol with an acidic boron compound. The 2-mercaptoalkanols have the general formula

HO—CR$_2$—CR$_2$—SH wherein R is as defined above.

Examples of such 2-mercaptoalkanols include:

2-mercaptoethanol
2-mercaptopropanol
2-mercaptobutanol
2-mercapto-2-methylpropanol
2-mercapto-2-methylbutanol
2-mercaptododecanol
10-mercapto-11-eicosanol
1-mercapto-2-propanol
1-mercapto-2-methyl-2-propanol
2,3-dibenzyl-3-mercapto-2-hexanol
1,1-diphenyl-2-mercapto-1-pentanol
1,2-dicyclohexyl-1-mercapto-2-ethanol
2,3-dimethyl-2-mercapto-3-butanol
3-benzyl-3-mercapto-2-methyl-2-pentanol
2-mercapto-2-methyl-1-propanol
1-mercapto-2-pentanol
2-mercapto-3-pentanol
3-mercapto-2-methyl-2-butanol
1-mercapto-2-methyl-2-butanol and the like.

The 2-mercaptoalkanol is esterified by an acidic boron compound such as orthoboric acid, metaboric acid, tetraboric acid, and boron oxide. The acidic boron compound is preferably used in an amount that provides about 1 boron atom for each 3 molecules of 2-mercaptoalkanol. Amounts of the boron compound providing from about 1 to about 5 boron atoms per 6 molecules of 2-mercaptoalkanol can be employed.

Esterification is conducted by contacting the 2-mercaptoalkanol with the acidic boron compound. A suitable diluent can be employed if desired. Suitable diluents include aromatic hydrocarbons such as benzene, toluene, xylene, and the like. Since it is most convenient to conduct the esterification reaction at the reflux temperature of the diluent, any diluent that is non-deleterious to the conversion which boils below the pyrolysis temperature of the tris(2-mercaptoalkyl)borate can be used. The diluent can be present in amounts up to about 95 weight percent of the reactor contents. Generally, the diluent chosen has a boiling point in the range of about 60° C. to about 100° C. at the pressure employed.

The esterification reaction is preferably conducted in an acidic medium. Generally, the acidic boron compound provides a sufficient degree of acidity, but, if necessary, sufficient mineral acid can be added to maintain the pH of the esterification reaction mixture below about 6.5.

Inasmuch as water is liberated by the esterification reaction, it is desirable to remove this water. While we can employ any convenient means for removing water of reaction which is not detrimental to the conversion process, we prefer to employ diluents which are capable of azeotroping water. Use of such diluents makes possible removal of water by means of a water trap on the returning diluent reflux stream. Aromatic hydrocarbon diluents such as mentioned above can be employed to remove water in this manner.

EXAMPLE I

Tris(2-mercaptoethyl)borate was produced by the esterification of 2-mercaptoethanol with boric oxide. To a reactor were charged 497 grams (6.36 mole) of 2-mercaptoethanol, 73 grams (1.05 mole) of B$_2$O$_3$, and 1500 milliliters of benzene. The reactor contents were heated to reflux temperature and maintained under reflux for about 9 hours. A water trap on the reflux return was employed to remove water of reaction. The reactor contents were then allowed to cool, and volatiles were stripped under vacuum. 465 grams of product were recovered. This constituted a 91.5 mole percent yield of tris(2-mercaptoethyl)borate based on the B$_2$O$_3$ charged.

EXAMPLE II

The tris(2-mercaptoethyl)borate formed in Example I was pyrolyzed to form 1,2-epithioethane. To a reactor was charged about 1 pound of 3 millimeter diameter glass beads. Reactor temperature was brought to 150° C., and 2.7 grams of sodium carbonate in 100 milliliters of water was added to the reactor. The water was flashed under aspirator vacuum while the reactor temperature was brought to 220° C. When all water had vaporized, as noted by a dry powder visible on the beads, the reactor was evacuated to about 12 mm. Hg vacuum, and 25 grams of tris(2-mercaptoethyl)borate as prepared in Example I was charged dropwise over a 10-minute period. Upon charging the tris(2-mercaptoethyl)borate, a liquid was noted to reflux in the reactor. Reaction was continued until no more liquid refluxed. All exhaust vapors were passed through a cold trap that was cooled with liquid nitrogen. The product was recovered from the cold trap and analyzed by gas liquid chromatography. A yield of 35.2 mole percent 1,2-epithioethane was effected, as based on the tris(2-mercaptoethyl)borate charged.

Reasonable variation and modification are permissible within the scope of this disclosure and the appended claims without departing from the spirit of our invention.

We claim:

1. Process for forming an epithioalkane comprising pyrolyzing tris(2-mercaptoalkyl)borate of the formula

B(—O—CR$_2$—CR$_2$—SH)$_3$ wherein each R is hydrogen, alkyl, cycloalkyl, aryl, aralkyl or alkaryl and wherein the epithioalkane contains a maximum of 20 carbon atoms.

2. Process of claim 1 wherein said tris(2-mercaptoalkyl)borate is selected from tris(2-mercaptoethyl)borate
tris(2-mercaptopropyl)borate
tris(2-mercapto-2-methylpropyl)borate
tris(2-mercapto-2-methylbutyl)borate
tris(2-mercaptododecyl)borate
tris(2-mercapto-1-nonylundecyl)borate
tris(2-mercapto-1-methylethyl)borate
tris(1-ethyl-2-mercapto-1-methylethyl)borate
tris(1,2-dibenzyl-2-mercapto-1-methylpentyl)borate
tris(1,2-diphenyl-2-mercaptopentyl)borate
tris(1,1-diphenyl-2-mercaptopentyl)borate
tris(2-mercapto-1,1,2-trimethylpropyl)borate
tris(2-benzyl-1,1-dimethyl-2-mercaptobutyl)borate
tris(2-mercapto-2-methylpropyl)borate
tris(2-mercapto-1-propylethyl)borate
tris(1-ethyl-2-mercaptopropyl)borate
tris(1,1-dimethyl-2-mercaptopropyl)borate
tris(1-ethyl-2-mercapto-1-methylethyl)borate and the like.

3. Process of claim 1 wherein said pyrolyzing is at a temperature of about 150° C. to about 500° C.

4. Process of claim 1 wherein said pyrolyzing is conducted in the presence of a basic material.

5. Process of claim 4 wherein said basic material is selected from sodium carbonate, sodium hydroxide, potassium hydroxide, tertiary amines, and alkali metal alkoxides.

6. Process of claim 1 wherein tris(2-mercaptoethyl) borate is pyrolyzed at a temperature of about 220° C. in the presence of a catalytic amount of sodium carbonate to form 1,2-epithioethane.

References Cited
UNITED STATES PATENTS

| | | | |
|---|---|---|---|
| 2,918,476 | 12/1959 | Queen | 260—327 |
| 3,457,277 | 7/1969 | Osborn et al. | 260—327 |

JAMES A. PATTEN, Primary Examiner

U.S. Cl. X.R.

260—462